(12) United States Patent
Jitaru

(10) Patent No.: US 11,736,029 B2
(45) Date of Patent: *Aug. 22, 2023

(54) PHASE-SHIFTED FULL-BRIDGE TOPOLOGY WITH CURRENT INJECTION

(71) Applicant: Rompower Technology Holdings, LLC, Milford, DE (US)

(72) Inventor: Ionel Jitaru, Tucson, AZ (US)

(73) Assignee: Rompower Technology Holdings, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/496,861

(22) Filed: Oct. 8, 2021

(65) Prior Publication Data

US 2022/0029547 A1    Jan. 27, 2022

Related U.S. Application Data

(63) Continuation of application No. 16/407,905, filed on May 9, 2019, now Pat. No. 11,146,177, which is a continuation-in-part of application No. 15/987,499, filed on May 23, 2018, now Pat. No. 10,291,140, which is a continuation-in-part of application No. 15/068,598, filed on Mar. 13, 2016, now Pat. No. 9,985,546.

(60) Provisional application No. 62/133,245, filed on Mar. 13, 2015.

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC . H02M 2007/4818; H02M 2007/4815; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 7/5387; H02M 2001/0058; H02M 2003/1586; H02M 2003/1552; Y02B 70/1433; Y02B 70/1475; Y02B 70/1491
See application file for complete search history.

(56) References Cited

U.S. PATENT DOCUMENTS

| 2002/0001203 A1* | 1/2002 | Jitaru | H02M 3/3376 363/17 |
| 2012/0147629 A1* | 6/2012 | Mao | H02M 3/28 363/17 |

* cited by examiner

*Primary Examiner* — Bryan R Perez
(74) *Attorney, Agent, or Firm* — Thomas W. Galvani, P.C.; Thomas W. Galvani

(57) ABSTRACT

Systems and method for optimizing the efficiency of operation of electronic circuits, configured structured according to a true soft-switching phase-shifted full-bridge topology (where all the primary switching elements turn on at zero voltage and the secondary switching elements turn off at zero current with no ringing and no spikes across the secondary switching elements) with the use of unique current-injection approaches. An additional advantage of the embodiments of this invention is that the true soft switching feature applies regardless of the leakage inductance in the transformer.

21 Claims, 11 Drawing Sheets

PHASE-SHIFTED FULL-BRIDGE TOPOLOGY WITH CURRENT INJECTION

CROSS-REFERENCE TO RELATED APPLICATIONS

This patent application is a continuation of and claims the benefit of prior U.S. patent application Ser. No. 16/407,905, filed May 9, 2019, which is a continuation in part of and claims the benefit of U.S. patent application Ser. No. 15/987,499, filed May 23, 2018, which, in turn, is a continuation-in-part of and claims the benefit of U.S. patent application Ser. No. 15/068,598 filed Mar. 13, 2016, which claims priority from the U.S. Provisional Patent Application No. 62/133,245 filed Mar. 13, 2015.

The disclosure of each of the above-identified patent applications is incorporated herein by reference.

FIELD

The invention relates to power converters configured according to a true soft switching phase-shifted full-bridge topology and, in particular, to such transformers in which the true soft switching occurs regardless of the value of the leakage inductance in a converter.

BACKGROUND

Over the years, the term "soft switching technologies" has been used do refer to technologies in which the primary switching elements (interchangeably referred to as primary switcher) in a converter are turned on at zero voltage. These technologies, however, are not configured to create soft switching across the secondary switching elements (interchangeably referred to as secondary switchers). Soft switching for the secondary switching elements of a power converter implies that the secondary switching elements turn off at zero current and there is substantially or completely no ringing and/or spikes of voltage across the secondary switching elements at time of turn off. Elimination of the ringing and spikes across the switching elements in the secondary implies that the turn off is carried out when the current through the secondary switching elements reaches zero or a small negative level and that the charge of the parasitic capacitance across the secondary switching elements is effectuates with a current source.

One of the most popular soft switching topologies is the phase-shifted full-bridge topology. Thus far, in order to obtain soft switching conditions across the primary switching elements, considered the leakage inductance of the converter to be a very important parameter, and such leakage inductance in the transformers was intentionally increased. In traditional soft switching phase-shifted full-bridge topologies, zero voltage switching was obtained by using the energy in the leakage inductance to discharge the parasitic capacitance reflected across the primary switches (.about.reflected through the transformer in the primary side). Sometimes, additional inductive elements were used as elements placed in series with the primary winding of the transformer to create a virtual leakage inductance. In some cases, the magnetizing current amplitude was increased in the transformer or in an inductor to form a virtual magnetizing current, in order to have enough energy in magnetizing current to discharge the parasitic capacitances across the primary switches.

Phase-shifted full-bridge topologies known to date do not ensure soft switching across the secondary rectifiers while the converter is operating in continuous mode. (As a result, large voltage spikes and ringing typically occur across the secondary rectifiers, which negatively affect the efficiency of the overall circuitry and the suppression of which requires the use of an additional electrical apparatus configured to be effective in protecting the transformers from electrical transients (known as a snubber).

SUMMARY

Embodiments of the invention provide a specifically-designed electronic circuitry for a DC-DC converter and methods for operation of same. In particular, embodiments of the invention provide a method for operating a pulse-shifted full-bridge (PSFB) DC-DC converter that includes: a primary side and a secondary side; a transformer having at least one primary winding at the primary side and at least one secondary winding at the secondary side, wherein a leakage inductance is formed between the at least one primary winding and at least one secondary winding; a bridge formed by two legs connected in parallel at the primary side, one leg being a linear leg and another leg being a resonant leg. Here, each leg is formed by corresponding bottom primary switching element and upper switching element at the primary side configured in a totem pole arrangement; where common terminals of the two legs are connected to an input voltage source; where shared terminals of switching elements within one leg, from the two legs, are connected to one end of at least one primary winding and wherein shared terminals of the switching elements of another leg, from the two legs, are connected to another end of at least one primary winding; where primary switching elements of a given leg, from the two legs, are configured to be complementarty to each other during operation of the converter with a period of dead time that includes driving signals from one leg to be phase-shifted with respect to driving signals from another leg. The converter further includes first and second synchronous rectifiers at the secondary side; at least one output inductor at the secondary side, and a current-injection electronic circuit. In the at least one output inductor at the secondary side, a first terminal of the at least one output inductor is connected to a load of the converter, while a second terminal of the at least one output inductor is directly connected to a synchronized rectifier from the first and second synchronous rectifiers. In the current-injection electronic circuit, there are a) two current-injection switching elements, respectively corresponding to switching elements in the resonant leg as well as b) two current-injection windings disposed on the secondary side and coupled to the at least one secondary winding of the transformer; c) two current-injection capacitors; two diodes; and d) a voltage-injection voltage source. Here, the two current-injection switching elements are connected to respectively-corresponding first terminals of two current-injection windings; and each of respectively-corresponding second terminals of the two current-injection windings is connected to a corresponding current-injection capacitor from the two current-injection capacitors. Furthermore, a cathode of each of the two diodes is connected to the corresponding current-injection capacitor at the corresponding second terminal and an anode of each of the two diodes is connected to the voltage-injection voltage source. Such converter operates according to the following operational steps:

1) switching on an upper primary switching element of the resonant leg and a bottom primary switching element of the linear leg, where upper primary switching element of the resonant leg and the bottom primary switching element of the linear leg defines a first diagonal of the bridge and, while the first synchronous rectifier is on, transferring power from the primary side to the secondary side (such transferring being characterized by linearly changing, with time, a first amplitude of first current flowing through the at least one output inductor and linearly increasing a second amplitude of magnetizing current of the transformer to a peak value of the second amplitude). 2) After switching off the bottom primary switching element of the linear leg and turning on the upper primary switching element of the linear leg, continuing the transferring power to the load and continuing the linearly changing of the amplitude, of current flowing through the at least one output inductor, to a lowest value of said first amplitude while maintaining the second amplitude of the magnetizing current at the peak value. 3) After switching off the upper switching element of the resonant leg, turning on a current-injection switching element corresponding to a bottom switching element of the resonant leg with a time delay with respect to the moment of said switching off the upper switching element to reflect an injection current, flowing through said current-injection switching element, in a secondary winding.

A related method for operation of the above-described converter (further complemented with a controlling electronic circuitry configured to generate control signals to the primary switching elements, the control signals having square waveforms), includes the following steps:

(1) Switching on an upper primary switching element of the resonant leg and a bottom primary switching element of the linear leg, where the upper primary switching element of the resonant leg and the bottom primary switching element of the linear leg define a first diagonal of the bridge and, while the first synchronous rectifier is on, transferring power from the primary side to the secondary side. Such transferring is characterized by linearly changing, with time, a first amplitude of first current flowing through the at least one output inductor and linearly increasing a second amplitude of magnetizing current of the transformer to a peak value of the second amplitude. (2) After switching off the bottom primary switching element of the linear leg and turning on the upper primary switching element of the linear leg, continuing the transferring power to the load and continuing the linearly changing of the amplitude (of current flowing through the at least one output inductor) to a lowest value of the first amplitude while maintaining the second amplitude of the magnetizing current at the peak value. (3) After switching off the upper switching element of the resonant leg, discharging a parasitic capacitance reflected across primary switching elements of the resonant leg, with the use of the leakage inductance. (4) Before switching off the upper switching element of the resonant leg, turning on a current-injection switching element corresponding to a bottom switching element of the resonant leg with a time interval that is adjustable with respect to the moment of switching off the upper switching element to reflect an injection current (flowing through said current-injection switching element) in a secondary winding. (5) Switching off the first synchronous rectifier after a sum of a magnetizing current (reflected in the secondary winding) and the injection current (reflected into the secondary winding) exceeds the lowest value of the first amplitude by a predefined excess amount of current to cause the excess amount of current to flow into at least one primary winding while continuing said discharging the parasitic capacitance towards zero.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

In the embodiments of this invention, through different means the current through the synchronous rectifiers is caused to reach zero before a switching element in a resonant leg of the circuitry turns on. At the moment when one of the synchronous reciters turn off and the magnetizing current can provide the current to the output inductor, and the additional current above the current demanded by the output inductor will flow into the primary discharging the parasitic capacitances of the primary switching elements to zero. Unlike the traditional method of obtaining soft switching using the energy in the leakage inductance in this technology zero voltage switching is guaranteed at and for any loading condition. To achieve the present goal, a process of discharge of the parasitic capacitances across the switching elements from a part of the resonant leg (by the magnetizing current and current from current injection source(s) introduced to the circuitry) starts to after the entire, total energy in the leakage inductance is used, and the voltage across the primary switching elements reach the specific lower level (the leakage current energy discharges the primary switching elements of such lower level, after which the magnetizing current and the current injection take off). The proposed methodology is operable with and applicable to any strength (value) of leakage inductance (including a situation in which the leakage inductance is absent) once the summation of the magnetizing current and the injection current is at a certain predetermined level, thereby eliminating an existing demand to have a minimum specified leakage inductance in the transformer.

Example 1

Figure 1:
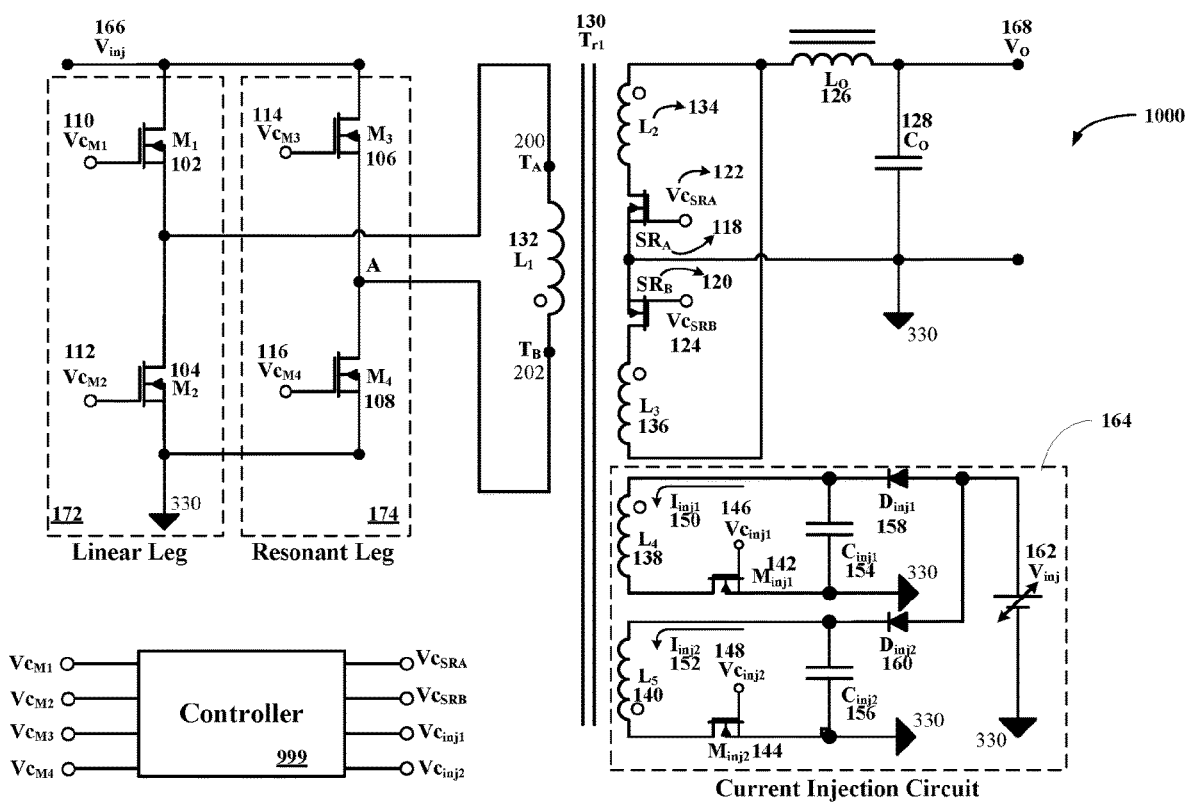
FIG. 1 schematically illustrates an electronic circuitry of DC-DC power converter configured according to a phase-shifted full-bridge topology with center tap secondary side and current injection.

FIG. 1 is a simplified schematic of a power converter structured according to a full-bridge topology with the center tap secondary side, which utilizes synchronous rectifiers as rectification means and that is configured to use current injection to obtain zero-voltage switching on or for all of the present switching elements in any operating condition. The electronic circuitry configured according to the soft-switching full-bridge topology is composed by two half-bridge legs, one formed by the combination of the switches (M1,102) and (M2, 104) and another—by the combination of the switched or switching elements (M3, 106) and (M4,108). In the full-bridge topology, the switches M1 and M2 form the so-called linear leg, and the switches M3 and M4 form the so-called resonant leg. The switching elements from the linear leg turn on at zero voltage switching conditions regardless of operating condition of the converter. When any of the switching elements within the linear leg is turned on, the voltage induced in the secondary winding is substantially zero. When any of the switching elements of the resonant legs is turned on, the voltage induced in the secondary winding is substantially larger than zero. The primary side of the transformer (Tr1, 130), represented by the primary winding (L1, 132), is connected to the full-bridge electronic structure through the terminations or termination contacts (TA, 200) and (TB, 202). The secondary windings of the transformer (Tr1, 130) are denoted as (L2, 134) and (L3, 136) and are connected to the synchronous rectifiers (SR.sub.A, 118) and (SR.sub.B, 120). The secondary windings are also connected to the output inductor (Lo, 126) and output capacitor (Co, 128). The voltage across the output capacitor (Co, 128) is denoted as (Vo, 168).

Besides the key electronic components that form the full-bridge topology portion of the overall circuitry of FIG. 1, this overall circuitry includes the current injection circuit 164 (outlined with a dashed line), the use of which is described below.

The current injection electronic circuit 164 contains two sub-circuits (one associated with the auxiliary winding (L4, 138) and the corresponding auxiliary switch (Minj1, 142), and another—with the auxiliary winding (L5, 140) and the corresponding auxiliary switch (Minj, 144)). The two sub-circuits in operation produce currents (Iinj1, 150) and (Iinj2, 152), as discussed below. These two currents are activated by two control signals, (Vcinj1, 146) and (Vcinj2, 148) applied to the switches (Minj, 142) and (Minj2, 144) respectively-corresponding to the sub-circuits at hand.

The overall electronic circuitry 1000 of FIG. 1 additionally includes the controller 999, which is appropriately configured to produce the signals governing the operation of the primary switches in the primary side, for the synchronous rectifiers in the secondary side, and also for the current injection circuit 164.

Figure 2:
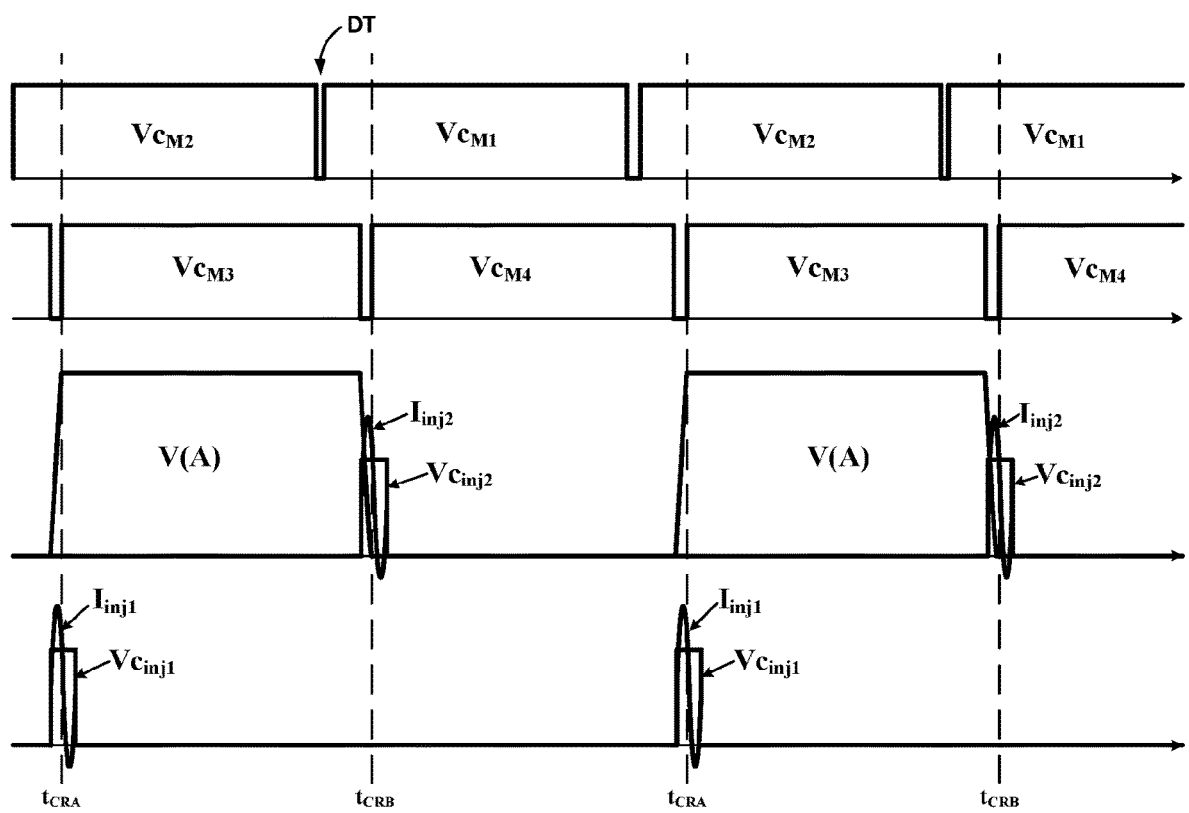
FIG. 2 schematically illustrates the key waveforms representing the operation of the embodiment of converter of FIG. 1.

As a person of skill in the art will readily appreciate, the electronic circuitry of FIG. 1 can be transformed to a circuitry structured according to a phase-shifted full-bridge (PSFB) topology, if the control signals for the primary switching elements, M1, M2, M3 and M4 are judiciously timed as depicted in FIG. 2.

The switching elements (M1,102) and (M2, 104) of FIG. 1, which together form the linear leg in the primary side of the converter, are operationally-complementary to each other, as depicted in FIG. 2. When one of these switching devices is "on", the other is "off". There is a small time interval between the period of "on" operation of these switches, when both switching devices are "off", referred to as a "dead time" interval, DT. The switching elements or devices (M3, 106) and (M4, 108) of the resonant leg are also operationally-complementary to each other, as depicted in FIG. 2.

In operation of the converter of FIG. 1, the energy is transferred from the primary winding (L1, 132) to the secondary windings (L2,134) and (L3, 136) only when switches in the pair of switches (M1, 102) and (M4, 108) conduct (are "on") at the same time or switches in the pair of switches (M3, 106) and (M2, 104) conduct (are "on") at the same time.

The switching elements M1 and M2, placed in the linear leg, turn on at zero voltage switching conditions under most of the operating conditions. The switching elements M3 and M4 do not turn "on" at zero voltage switching conditions except if special requirements are met. Various solutions have been proposed of how to ensure that the switching elements located on the resonant leg can be turned "on" at zero voltage switching conditions, including those discussed in U.S. Pat. Nos. 5,231,563; 6,862,195; 7,009,850; and 9,985,546 (all of which, aggregately or individually, are referred to as Our Prior Publications). U.S. Pat. No. 9,985, 546, for example, discloses a method for obtaining zero voltage switching conditions in the phase-shifted full-bridge topology by utilizing the magnetizing current in addition to a current injection in the transformer. The disclosure of the present invention is directed to improving the efficiency of the current injection methodologies for use in power converters.

FIG. 2 contains plots illustrating the key waveforms of the operation of the PSFB topology equipped with current injection. Time moments labelled as t.sub.CRA and t.sub.CRB identify critical times when switching devices from the resonant leg of FIG. 1 are turned "on". Specifically, t.sub.CRA is the time when the switching element (M3, 106) turns "on", and t.sub.CRB is the time when the switching element (M4, 108) turns "on". At these times, the voltage across the switching elements that turn "on" is set to zero in order to obtain zero voltage switching conditions.

As depicted in FIG. 2, the injection current Iinj1 is used to ensure that the switch (M3, 106) is turned "on" at zero voltage switching conditions by discharging the parasitic capacitance reflected across the switch M3. The injection current Iinj2 is used to ensure that the switch (M4, 108) turns "on" at zero voltage switching conditions by discharging the parasitic capacitance reflected across such switch.

Figure 3:
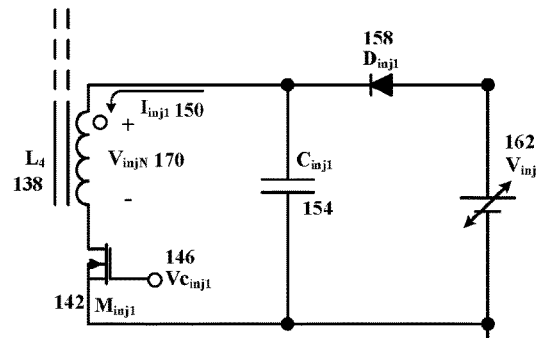
FIG. 3 depicts a section of the current injection circuit of the embodiment of FIG. 1.

FIG. 3, which presents only a portion or section of the current injection circuit 164 of the embodiment 1000 of FIG. 1, facilitates the understanding of the embodiment of FIG. 1. The shown portion 3000 of the current injection circuit 164 is composed of the auxiliary current-injection winding (L4, 138); the auxiliary switch (Minj1, 142), controlled by a control signal (Vcinj1, 146): and a current injection capacitor (Cinj1, 154). The U.S. patent application Ser. No. 15/987,499, the disclosure of which is incorporated herein by reference, disclosed a current injection circuit formed by a current injection switch, a current injection winding, and a current injection capacitor. As was discussed in U.S. patent application Ser. No. 15/987,499, for that current injection circuit of the related art to work in a way wherein the current injection can be controlled by the phase shift between the control signal of the current injection and the control signal of the corresponding primary switch, the capacitance of the current injection capacitor Cinj1 has to have such a high value that the voltage ripple across this capacitor is much smaller than the average voltage value. Such solution, presented in the U.S. patent application Ser. No. 15/987,499, leads to higher RMS current through the current injection switch and the current injection winding, because the energy provided by the current injection capacitor to the current injection has to be replenish at each cycle of the operation, thereby leading to circulation of large energy and, as a result, an increase of the RMS current.

In advantageous distinction from the current injection circuit of U.S. patent application Ser. No. 15/987,499, the embodiment of the current injection circuit according to the idea of the present invention, is equipped with an additional diode (Dinj1,158) and a voltage source (Vinj1,162). Depending on the specifics of the particular implementation, the voltage source (Vinj, 162) can be configured to operate in a varying fashion, for example such as that when the voltage is controlled by a programmable processor according to a specific algorithm.

As the skilled person will readily appreciate, the portion of the current injection circuit 164 implemented according to the embodiment 3000 offers substantial flexibility to the electronic-circuit designer. By sizing the value of the capacitance of (Cinj1, 154), one can control the resonant energy that is delivered by (the (Cinj1, 154), as well as the energy coming from (Vinj, 162) via the diode (Dinj1, 158). As a result, the shape of the current injection pulse delivered to the circuitry can also be controlled. The purpose for controlling the shape of the current injection pulse is to minimize the RMS current of the current injection (which remained an operational shortcoming in U.S. patent application Ser. No. 15/987,499) and to be able to discharge the parasitic capacitance of the switching element on the primary side corresponding to the particular injection current. For example, in FIG. 1, the primary switching element M3 corresponds to the injection current (Iinj1, 150) produced by the circuit 164, while the primary switching element M4 corresponds to the injection current (Iinj2, 152) produced by the current injection circuit 164.

Figure 4:
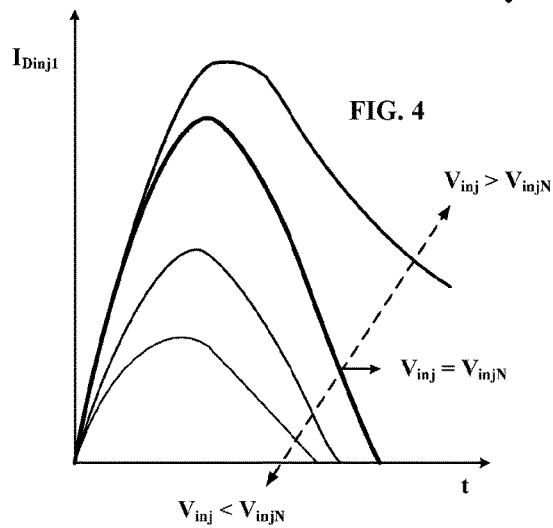
FIG. 4 contains plots illustrating time-dependency of current passing through the diode of the portion of the current injection circuit of FIG. 3 as a function of the amplitude of the voltage provided by the voltage source of the current injection circuit.

FIG. 4 contains plots illustrating time-dependency of current passing through the diode (Dinj, 158) as a function of the amplitude of Vinj. The quantity (VinjN, 170) represents the voltage in the current injection winding (here—in L4) when the corresponding current injection switch (here—(Minj1,142)) is "on". It can be deduced from FIG. 4 that the best voltage level for Vinj is VinjN.

Figure 5:
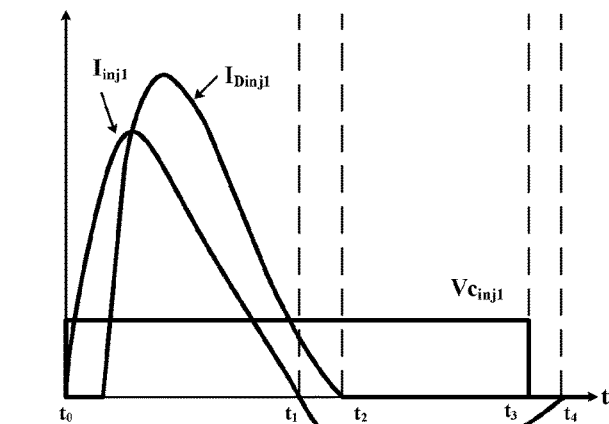
FIG. 5 illustrates the injection current, delivered by the portion of the current injection circuit of FIG. 3, and the current passing through the additional diode of the current injection circuit.

FIG. 5 illustrates the injection current Iinj1, delivered by the portion 3000 of the circuit 164, and the current through the Dinj1. In operation, the injection current Iinj1 is the summation (or aggregate) of the current through Dinj1 and the resonant current through Cinj1. The portion of the Iinj 1 cycle where the injection current is shown to have negative amplitude (that is, the time interval between t1 and t4) is tailored by the capacitance value of the Cinj1. This portion of the Iinj 1 cycle (the negative injection current between times t1 and t4) is very important for the proper operation of the current injection circuit. Indeed, without the presence of the negative portion of the injection current, the current injection switch Minj1 would turn "off" when a positive current flows through it, thereby leading to very high voltage spikes across the switch Minj1. According to the idea of the invention, however, the current injection switch (Minj1, 142) is turned "off" at the moment t3, which is a time moment chosen between t1 and t4 while the Iinj1 current is negative. The current Iinj1 continues to flow through Minj1 after Minj1 turns "off".

During the operation of the current injection circuit 164, the capacitor Cinj1 plays the role of shaping the time-dependent profile of the injection current, Iinj1, to create the required negative current and to increase the injection current amplitude as needed. The goal for the optimum shape of the injection current is to have a low RMS value and be able to discharge the parasitic capacitance of the corresponding switching element.

Figure 6:
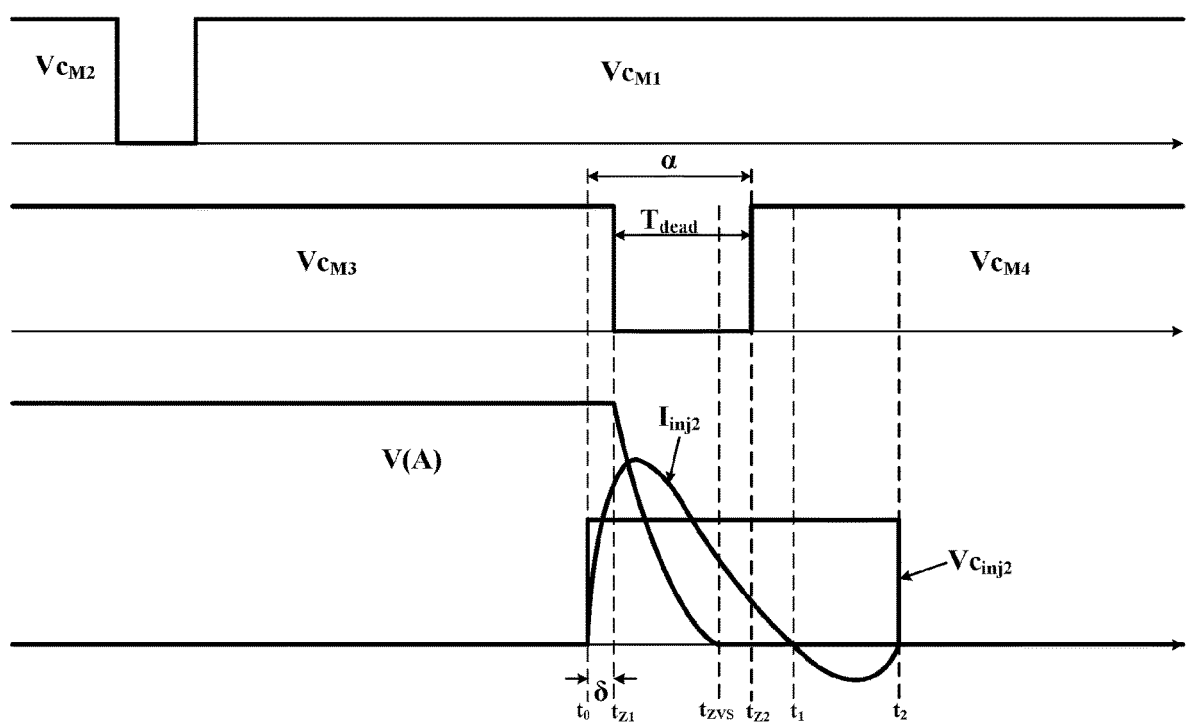
FIG. 6 depicts the control signals for the primary switching elements and the timing of the identified injection current according to an embodiment of this invention.

FIG. 6 contains plots representing time-dependent control signals for the primary switching elements (shown as having square-shaped waveforms) and the control signals for one of the current injection control signals, in this case—Vcinj2, configured according to an embodiment of the invention. (The electronic schematic and key waveforms were described in reference to FIGS. 1 and 2). As depicted in FIG. 6, the control signal for Minj2 is activated ahead of and prior to the control signal for the primary switch M4, by a time period a. In some applications, the duration of this lead-time-interval a can be even larger than the duration Tdead of the "dead time" interval between the operation of the primary switches in each of the linear and resonant legs. As depicted in FIG. 6, the control signal for the current injection can overlap with the control signal for the corresponding primary switch (M3 in this case) with some operational benefits.

Figure 7:
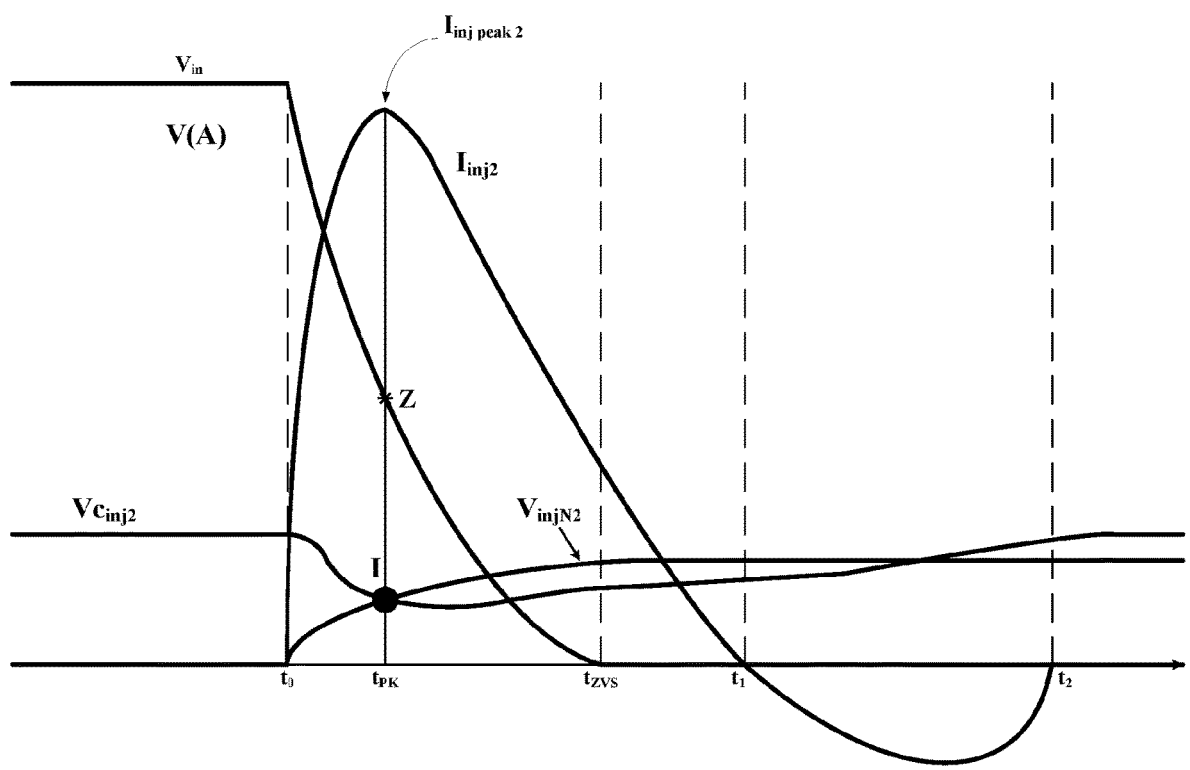
FIG. 7 shows plots representing several key waveforms associated with the current injection and the conditions at which the current injection reaches the peak value.

FIG. 7 illustrates several key waveforms that play role in shaping the injected current according to an embodiment of the invention. The waveforms presented in FIG. 7 include V(A), where A is the switching node of the resonant leg 174 depicted in FIG. 1.

As presented in FIG. 7, at the moment t0—when the primary switch M3 turns "off"—the voltage in the switching node A starts decaying towards the zero level. The control signal for (Minj2, 144)—that is the signal Vcinj2—is turned "on" at the time when M3 is turned "off". VinjN2 starts building up as the voltage in node A decays. The voltage across Cinj2 starts decaying because a portion of the injection current Iinj2 is delivered from the Cinj2 capacitor. At the moment $t_{PK}$, the voltage across the capacitor Cinj2 equalizes with the level of VinjN2, when the injection current Iinj2 reaches its peak value. Iinj peak2, and after that moment the injection current Iinj2 starts decaying. The voltage level at the node A at the moment when Iinj2 reaches its peak value is shown as Z. In one implementations of the idea of the invention, the current injection is configured to reach its peak at a voltage level within the range from about 0.125*Vin and below about 0.5*Vin.

Figure 8:
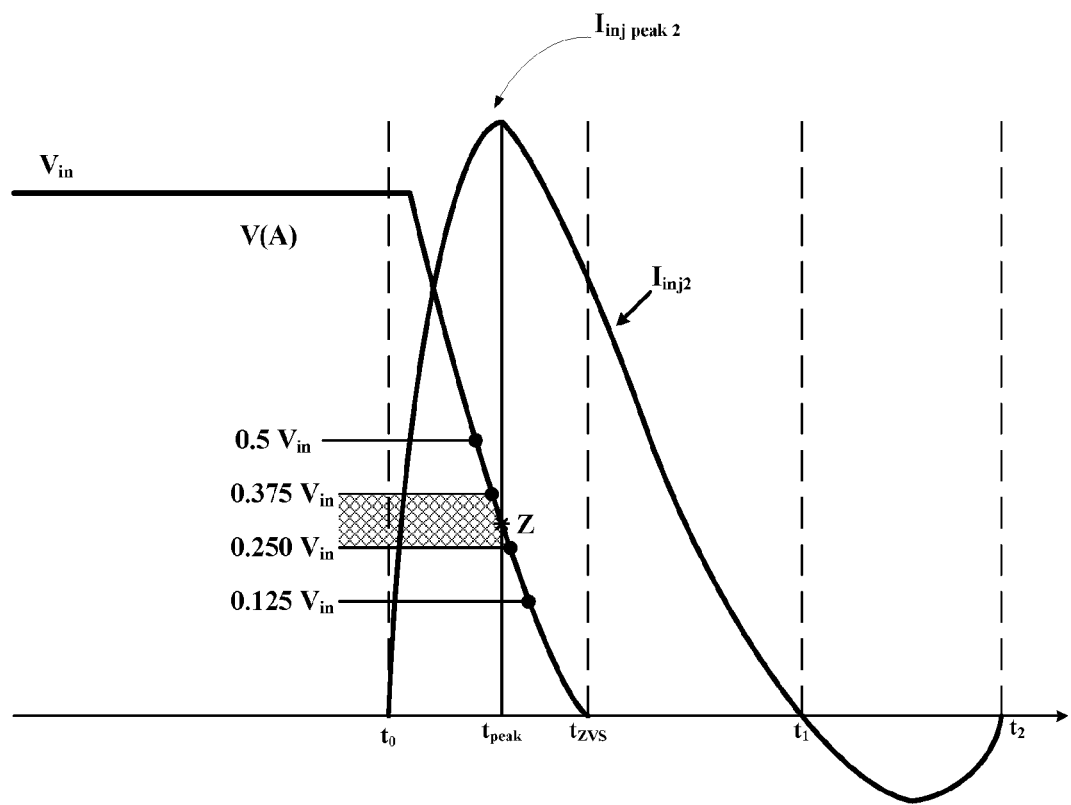
FIG. 8 addresses the most desirable timing for reaching the peak of the current injection into the embodiment of the converter as a function of voltage at the switching node in the primary side of the converter.

To that end, a related embodiment of injection current and the voltage at the switching node A of the primary side of the transformer is presented in FIG. 8: this embodiment represents the optimized situation where the Z voltage level (at which injection current reaches its peak) is between about 0.375*Vin and about 0.250*Vin. In an ideal resonant circuit, where a capacitor is resonantly discharged by a half resonant shape current, the peak current value would be at a Z voltage level of about 0.5*Vin. (In comparison, in embodiments disclosed in U.S. patent application Ser. No. 15/987,499, where the capacitance of the Cinj capacitor has a value large enough to ensure that the ripple across the capacitor Cinj is much smaller than average voltage across the capacitor Cinj, the peak value of the injected current is reached at the moment of time that comes later, after the voltage at switch node A reaches zero, after $t_{ZVS}$, which is the time at which the zero-voltage switching conditions are achieved). The optimized current injection methodology, configured according to an embodiment of the invention, requires that the discharge of the parasitic capacitance reflected across of the primary switching element be done by current injection with minimum (minimized) RMS value. As can be seen in FIG. 8, after the voltage in the switch node A reaches zero level at the moment $t_{ZVS}$, the current injection amplitude should decrease rapidly to reduce the RMS current of the current injection.

As the person of skill will readily appreciate, the circuit for the current injection a portion 3000 of which is presented in FIG. 3 can accomplish the goal of a low RMS value of the injected current, produced by such circuit, while maintaining the capability of the current injection to discharge the parasitic capacitance reflected across the corresponding primary switch. For example, the parasitic capacitance reflected across M4 is discharged by the injection current Iinj2, and the parasitic capacitance reflected across M3 is discharged by the injection current Iinj1, as per FIG. 1. The portion of the current injection circuit 3000 depicted in FIG. 3 (in which the energy for the current injection is delivered by i) a voltage source (Vinj, 162) producing voltage of a suitable amplitude close to VinjN and ii) from the resonant capacitors (Cinj1, 154) and respectively (Cinj2, 156) can optimize the shape and the RMS current of the current injection for the highest efficiency.

Notably, unlike in the methodology disclosed by Mao in U.S. Pat. No. 7,548,435 (where the current injection is only resonant and the amplitude of the current injection cannot be controlled through a phase shift or other means), the embodiment of the invention are configured to enable a full control of the current injection amplitude by a phase shift between the control signal for the current injection switch and the control signal of the corresponding primary switch: In reference to FIG. 6, the amplitude of the current injection is controlled by controlling the value of .alpha. Additionally—and unlike in the case of the circuitry discussed in U.S. patent application Ser. No. 15/987,499—the control signal for the current injection switches, Minj1 and Minj2, is allowed to overlap with the control signal of the complementary switch of the corresponding switch on the resonant leg of the circuitry 1000. By turning "on" the current injection switch at the moment t0—that is, ahead of the moment $t_{Z1}$ when the complementary switch of the corresponding primary switching element is turned "off" (this time interval is denoted as .delta. in FIG. 6), the current injection Iinj2 is caused to build up ahead of time, which speeds up the discharge of the parasitic capacitance. In addition to that, the increase of the amplitudes of the VinjN1 and respectively VinjN2 waveforms is delayed, as depicted in FIG. 7, which delay affects the increase of the rate of rise of the injection currents Iinj1 and respectively Iinj2. By decreasing the time difference between the moments t0 and tpk, the RMS current of the current injection is decreased (for the same peak value of the Iinjpeak).

Figure 9A:
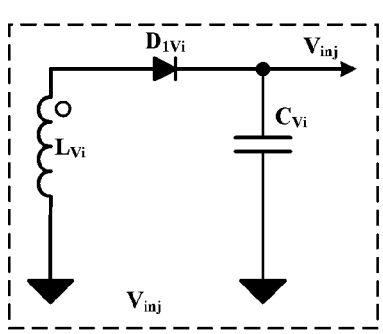
FIGS. 9A, 9B, 9C presents methodology of obtaining the current injection voltage source for the current injection circuit.
Figure 9B:
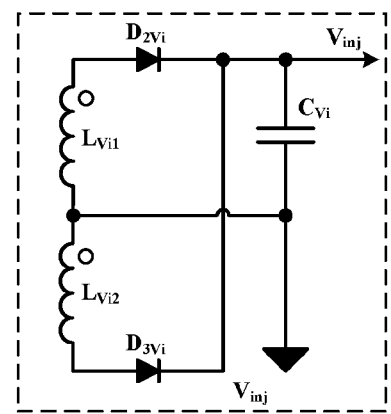
Figure 9C:
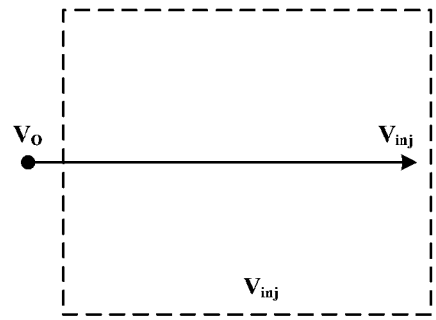

Referring now to FIGS. 9A, 9B, and 9C, which will be readily understood by a person of skill in the art, different methods of structuring the voltage source Vinj are illustrated. In particular, FIG. 9C illustrates the situation when the voltage injection source is realized by using the output voltage of the converter (if that voltage is close in value to VinjN from FIG. 3).

Example 2

Figure 10:
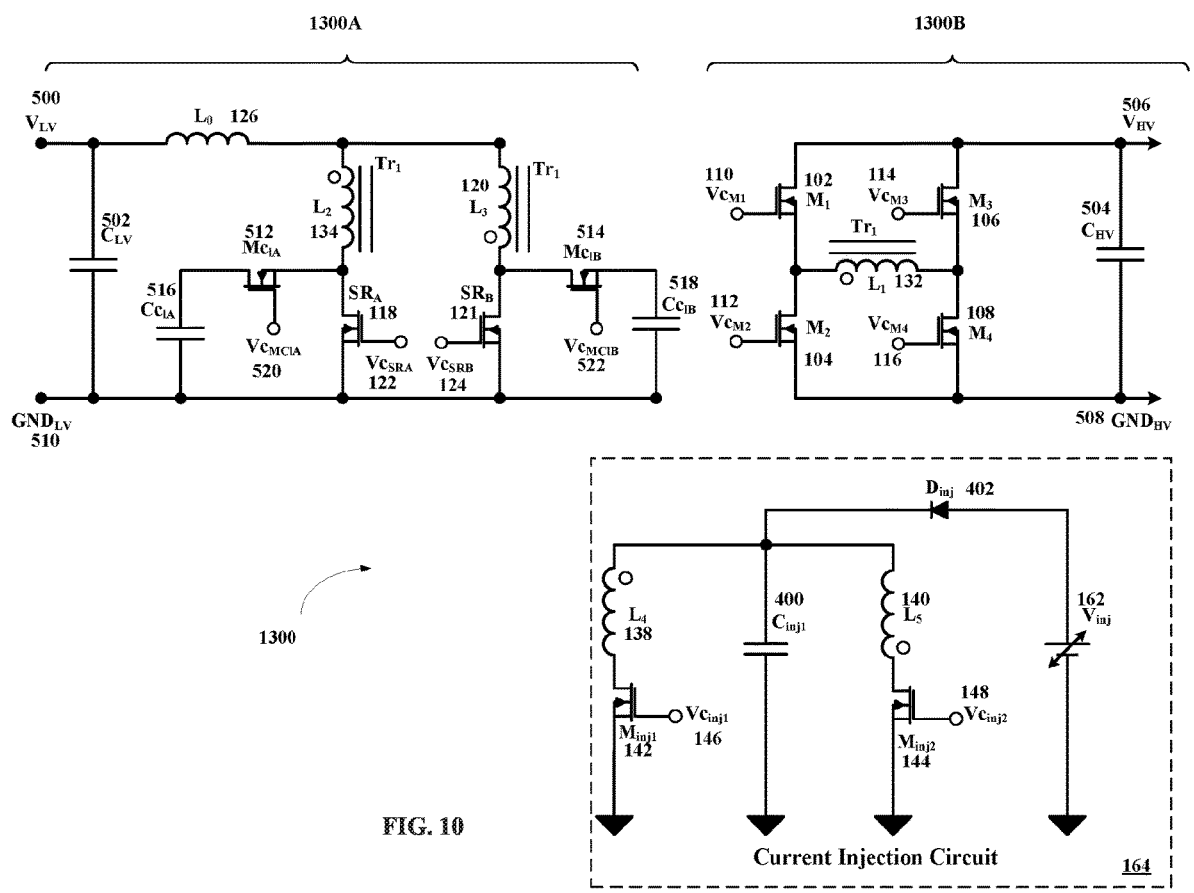
FIG. 10 shows the electronic circuitry structured according to the full-bridge-with-current-injection topology and configured to transfer the energy in reverse (from the low-voltage buss to the high-voltage buss).

Here we discuss an example of a Phase-Shift Full-Bridge topology with current injection configured to operate as a current-fed push-pull converter. In some applications—such as, for example, an auxiliary battery charger for automotive industry, a DC-DC converter must have the capability to transfer energy in reverse: from the low voltage (for example 12 V battery) to the high voltage, (for example, a 400 V buss). FIG. 10 illustrates an example of a phase-shifted full-bridge topology of the electronic circuitry, which in operation transfers the energy from the low voltage buss to the high voltage buss. Such mode of operation of a power converter is referred to herein as a current-fed push-pull power conversion.

Figure 11:
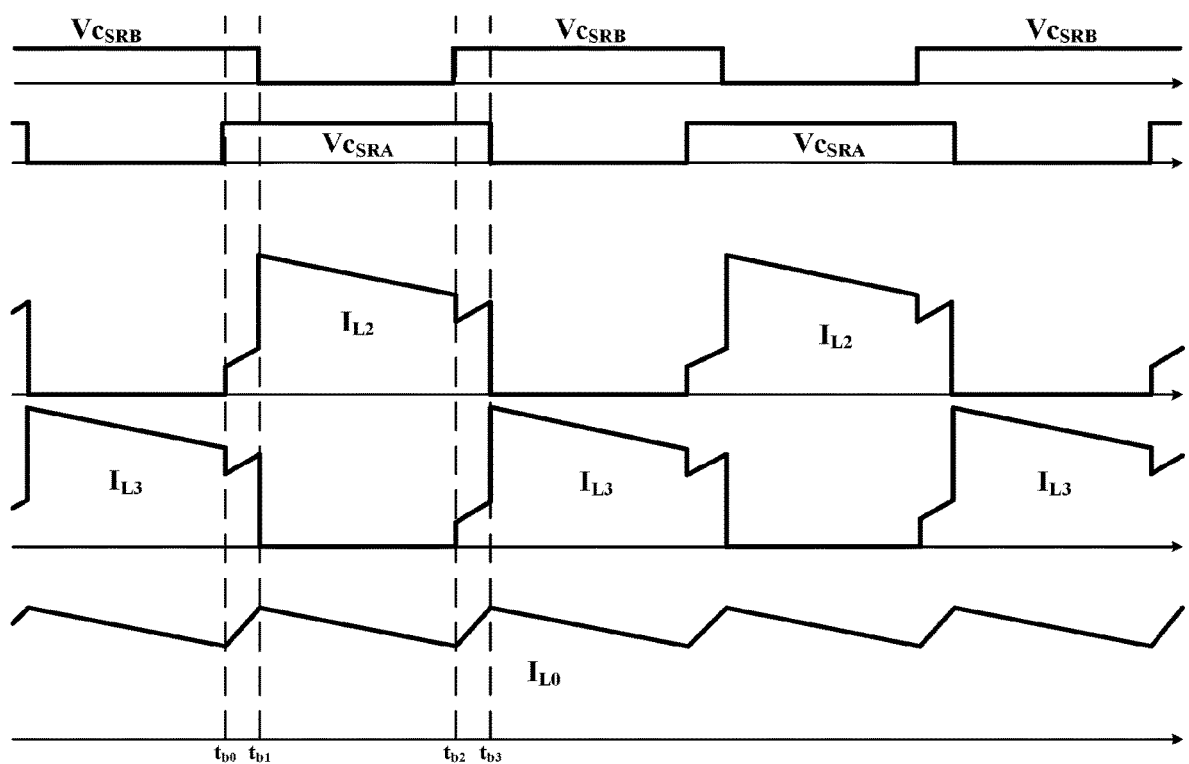
FIG. 11 shows the key waveforms for the circuit of FIG. 10.

Here, the energy comes from the low voltage side 1300A of the transformer that has ($V_{LV}$, 500) and is transferred to the high voltage buss 1300B having ($V_{HV}$, 506). Additionally is shown a portion of the current-injection circuit. FIG. 11 contains plots illustrating, as functions of time, the key waveforms representing the operation of the converter circuit of FIG. 10 and including $Vc_{SRA}$ (the control signal for synchronous rectifier $SR_A$) $Vc_{SRB}$ (the control signal for the synchronous rectifier $SR_B$), $I_{L2}$ (representing the current through the winding L2), $I_{L3}$ (representing the current passing through the winding L3), and $I_{L0}$ (representing the current passing through the output inductor Lo)

The switching elements $SR_A$ and $SR_B$ are "on" during the same time during the time interval between $t_{b0}$ and $t_{b1}$ and during the time interval between $t_{b2}$ and $t_{b3}$. The period(s) of simultaneous conduction $SR_A$ and $SR_B$ is necessary in order to create a boost action and be able to control the high voltage buss amplitude, $V_{HV}$. Because the coupling in the transformer Tr1, between/among the windings L1, L2, and L3 it does not reach 100%, there exists a leakage inductance between/among L2, L3, and L1. As a result, when the synchronous rectifiers ($SR_A$, 118), and ($SR_B$, 121) are turned off, the energy of leakage inductance in the transformer Tr1 causes voltage spikes across the rectifiers $SR_A$ and $SR_B$.

Figure 12:
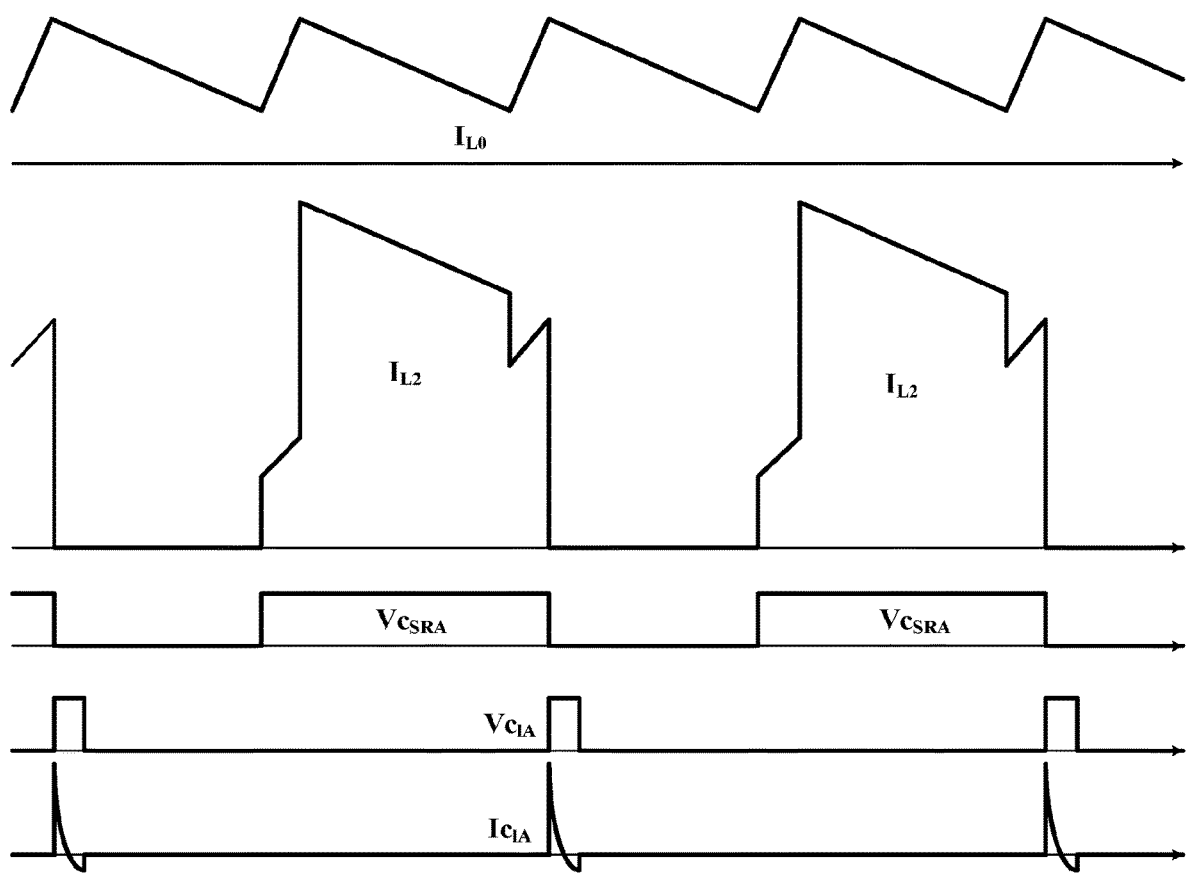
FIG. 12 illustrates the key waveforms from the circuit from FIG. 10 with emphasis on the active clamp circuit.

In FIG. 12 are depicted the key waveforms of the low-voltage section of the converter of FIG. 10, which waveforms include the current $I_{L0}$ through the output inductor (Lo, 126); the current $I_{L2}$ through L2; the control signal for $SR_A$: $Vc_{SRA}$; the control signal for the switch $M_{C1A}$ and the current $I_{Cc1A}$ through the clamp capacitor $C_{c1A}$.

As a person of skill will readily appreciate, the active clamp circuit formed by $M_{c1A}$ and $C_{c1A}$—and that formed by another pair of the switch $M_{c1B}$ and clamp capacitor C.sub.clB—operate as active clamps. For example, in operation, when SR.sub.A turns "off", the leakage inductance existing between the windings L2 and L3 and L1 will force some of the current flowing through SR.sub.A to flow via the switch M.sub.clA for a short period of time until M.sub.clA is turned "on". That current flow will charge the clamp capacitor C.sub.clA, which now acts as a current mirror and push back into the L1 winding and further to the V.sub.HV high-voltage buss. The same developments occur when SR.sub.B is turned "off", as a result of which the leakage inductance current flowing through L3 is caused to flow through M.sub.clB towards C.sub.clB and further mirrored back to the high-voltage buss via the winding L1.

Figure 13:
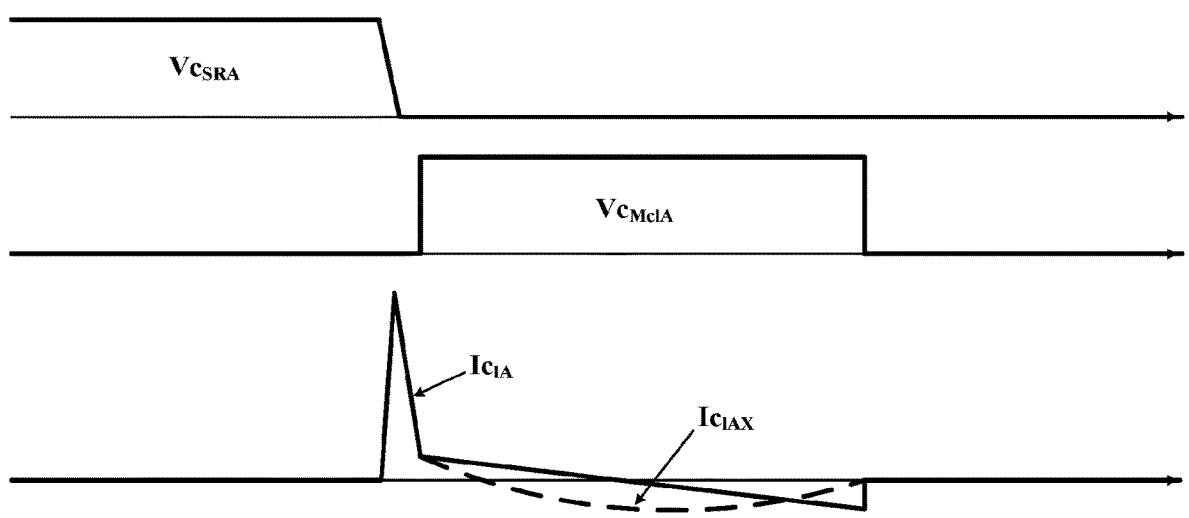
FIG. 13 contains plots representing the key waveforms of the active clamp circuit as part of the circuit depicted in FIG. 10. Each of the plots representing a key waveform shows a dependency of particular characteristic(s) or parameter(s) as a function of time. Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

FIG. 13 illustrates the control signal Vc.sub.SRA for the synchronous rectifier SR.sub.A, the control signal Vc.sub..MclA for the switch M.sub.clA, and the current Ic.sub.lA flowing through C.sub.clA (and reaching zero level before the moment of time when MclA turns "off"). For a lower value of the capacitance C.sub.clA, the shape of the current waveform Ic.sub.lA is changed, and during the period of conductance of the switch M.sub.C1A assumes the form depicted by the portion I.sub.clAx of the curve. The current through the clamp capacitor will be shaped as depicted by I.sub.ClAX when the leakage inductance energy between L2 and L1 is transferred to V.sub.HV buss 1300B before the clamp switch M.sub.clA turns "off".

It is appreciated that described methodologies can also be applied to operation of other topologies (such as asymmetrical half bridges and asymmetrical full bridges, push pull, half bridges, and single ended and double ended forward topologies, as well as to any other derivation of forward derived topologies; center tap, and full bridge rectification circuitries).

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Other specific examples of the meaning of the terms "substantially", "about", and/or "approximately" as applied to different practical situations may have been provided elsewhere in this disclosure.

An embodiment of the system generally may include electronic circuitry (for example, a computer processor and/or controller) governing an operation of the embodiment and controlled by instructions stored in a memory, to perform specific data collection/processing and calculation steps as disclosed above. The memory may be random access memory (RAM), read-only memory (ROM), flash memory or any other memory, or combination thereof, suitable for storing control software or other instructions and data. Those skilled in the art should would readily appreciate that instructions or programs defining the operation of the present embodiment(s) may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole. Various changes in the details, steps and components that have been described may be made by those skilled in the art within the principles and scope of the invention.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

What is claimed is:

1. A method for operating a pulse-shifted full-bridge (PSFB) DC-DC Converter, the converter comprising:
    a primary side and a secondary side;
    an input voltage source, defining a primary energy storage element;
    a transformer having at least one primary winding at the primary side and at least two secondary windings at the secondary side, wherein a leakage inductance is formed between the at least one primary winding and the secondary windings;
    a bridge formed by two legs connected in parallel at the primary side, one leg being a linear leg and another leg being a resonant leg,
        wherein each leg is formed by corresponding bottom primary switching element and upper switching element at the primary side configured in a totem pole arrangement, wherein common terminals of the two legs are connected to the input voltage source,
wherein shared terminals of switching elements within one leg, from the two legs, are connected to one end of at least one primary winding and wherein shared terminals of the switching elements of another leg, from the two legs, are connected to another end of at least one primary winding,
wherein primary switching elements of a given leg, from the two legs, are configured to be complementary to each other during operation of the converter with a period of dead time that includes driving signals from one leg to be phase-shifted with respect to driving signals from another leg;
first and second synchronous rectifiers at the secondary side connected to each of the secondary windings, and secondary rectification elements at the secondary side connected in parallel, wherein one of the secondary rectification elements is formed by the first synchronous rectifier and the secondary winding connected to it, and another of the secondary rectification elements is formed by the second synchronous rectifier and the secondary winding connected to it;
at least one output inductor at the secondary side, wherein a first terminal of the at least one output inductor is connected to a load of the converter, wherein a second terminal of the at least one output inductor is directly connected to a common connection of the secondary rectification elements; and
wherein the load of the converter contains a capacitor in which energy is stored, defining a secondary energy storage element;
two active clamp circuits placed across the first and second synchronous rectifiers, wherein each of the active clamp circuits is formed by a mosfet in series with a clamp capacitor, wherein an anode of each body diode of the mosfet is connected to a drain of each of the first and synchronous rectifiers; and
a current-injection electronic circuit that includes:
two current injection switching elements, respectively corresponding to switching elements in the resonant leg; and
two current-injection windings disposed on the secondary side and coupled to the primary and secondary windings of the transformer; and
two current injection capacitors;
two diodes; and
a voltage-injection voltage source;
wherein the two current-injection switching elements are connected to respectively corresponding first terminals of two current-injection windings, wherein each of the respectively corresponding second terminals of the two current-injection windings is connected to a corresponding current-injection capacitor from the two current-injection capacitors;
wherein a cathode of each of the two diodes is connected to the corresponding current-injection capacitor at the corresponding second terminal, and an anode of each of the two diodes is connected to the voltage-injection voltage source;
a controlling electronic circuitry configured to generate control signals to the primary switching elements, the control signals having square waveforms;
the method comprising:
(a) Switching on an upper primary switching element of the resonant leg and a bottom primary switching element of the linear leg, the upper primary switching element of the resonant leg and the bottom primary switching element of the linear leg defining a first diagonal of the bridge and,
while the first synchronous rectifier is on, transferring power from the primary side to the secondary side, wherein the transferring is characterized by linearly changing, with time, a first amplitude of first current flowing through the at least one output inductor and linearly increasing a second amplitude of magnetizing current of the transformer to a peak value of the second amplitude;
(b) After switching off the bottom primary switching element of the linear leg and turning on the upper primary switching element of the linear leg, continuing the transferring power to the load and continuing the linearly changing of the amplitude, of current flowing through the at least one output inductor, to a lowest value of the first amplitude while maintaining the second amplitude of the magnetizing current at the peak value;
(c) After switching off the upper switching element of the resonant leg, turning on a current-injection switching element corresponding to a bottom switching element of the resonant leg with a time delay with respect to the moment of the switching off the upper switching element to reflect an injection current, flowing through the current-injection switching element, in a secondary winding.

2. The method according to claim 1, further comprising:
(d) After switching off the upper switching element of the resonant leg, discharging a parasitic capacitance reflected across primary switching elements of the resonant leg, with the use of the leakage inductance; and
(e) Switching off the first synchronous rectifier after a sum of a magnetizing current, reflected in the secondary winding, and the injection current reflected into the secondary winding, exceeds the lowest value of the first amplitude by a predefined excess amount of current to cause the excess amount of current to flow into at least one primary winding while continuing the discharging the parasitic capacitance towards zero.

3. The method according to claim 2, further comprising:
(f) Cyclically repeating at least steps (a) through (c) with the use of the second synchronous rectifier and a second diagonal of the bridge formed by the upper primary switching element of the linear leg and a bottom primary switching element of the resonant leg, and the second synchronous rectifier.

4. The method according to claim 1, further comprising controlling the second amplitude of the magnetizing current by varying a frequency of driving signals of the primary and secondary switching elements.

5. The method according to claim 1, further comprising varying an amplitude of the injection current by varying the time delay.

6. The method according to claim 1, wherein the converter is configured according to one of a center tap topology, a current doubler topology, and a full bridge rectification.

7. The method according to claim 1, further comprising the step of tailoring an amplitude of the injection current by varying the time delay to cause a discharge of a parasitic capacitance of a primary switching element of the given leg to zero before the primary switching element turns on.

8. The method according to claim 1, further comprising the step of tailoring the second amplitude of the magnetizing current by varying a frequency of a driving signal of a switching element from the primary switching elements to cause a discharge of a parasitic capacitance of the switching element to zero before the switching element turns on.

9. The method according to claim 1, further comprising the step of tailoring the second amplitude of the magnetizing current by varying a frequency of a driving signal of a switching element from the primary switching elements while also tailoring an amplitude of the injection current by varying the time delay to cause a discharge of a parasitic capacitance of the primary switching element to zero before the primary switching element turns on.

10. A method for operating a pulse-shifted full-bridge (PSFB) DC-DC Converter, the converter comprising:
   a primary side and a secondary side;
   an input voltage source, defining a primary energy storage element;
   a transformer having at least one primary winding at the primary side and at least two secondary windings at the secondary side, wherein a leakage inductance is formed between the at least one primary winding and the secondary windings;
   a bridge formed by two legs connected in parallel at the primary side, one leg being a linear leg and another leg being a resonant leg,
      wherein each leg is formed by corresponding bottom primary switching element and upper switching element at the primary side configured in a totem pole arrangement,
      wherein common terminals of the two legs are connected to the input voltage source,
      wherein shared terminals of switching elements within one leg, from the two legs, are connected to one end of at least one primary winding and wherein shared terminals of the switching elements of another leg, from the two legs, are connected to another end of at least one primary winding,
      wherein primary switching elements of a given leg, from the two legs, are configured to be complementary to each other during operation of the converter with a period of dead time that includes driving signals from one leg to be phase-shifted with respect to driving signals from another leg;
   first and second synchronous rectifiers at the secondary side connected to each of the secondary windings, and secondary rectification elements at the secondary side connected in parallel, wherein one of the secondary rectification elements is formed by the first synchronous rectifier and the secondary winding connected to it, and another of the secondary rectification elements is formed by the second synchronous rectifier and the secondary winding connected to it;
   at least one output inductor at the secondary side, wherein a first terminal of the at least one output inductor is connected to a load of the converter, wherein a second terminal of the at least one output inductor is directly connected to a common connection of the secondary rectification elements; and
   wherein the load of the converter contains a capacitor in which energy is stored, defined as the secondary energy storage element;
   two active clamp circuits placed across the first and second synchronous rectifiers, wherein each of the active clamp circuits is formed by a mosfet in series with a clamp capacitor, wherein an anode of each body diode of the mosfet is connected to a drain of each of the first and second synchronous rectifiers; and
   a current-injection electronic circuit that includes:
      two current injection switching elements, respectively corresponding to switching elements in the resonant leg; and
      two current-injection windings disposed on the secondary side and coupled to the primary and secondary windings of the transformer; and
      two current injection capacitors;
      two diodes; and
      a voltage-injection voltage source;
      wherein the two current-injection switching elements are connected to respectively corresponding first terminals of two current-injection windings, wherein each of respectively-corresponding second terminals of the two current-injection windings is connected to a corresponding current-injection capacitor from the two current-injection capacitors;
      wherein a cathode of each of the two diodes is connected to the corresponding current-injection capacitor at the corresponding second terminal and an anode of each of the two diodes is connected to the voltage-injection voltage source; and
   a controlling electronic circuitry configured to generate control signals to the primary switching elements, the control signals having square waveforms;
the method comprising:
(i) Switching on an upper primary switching element of the resonant leg and a bottom primary switching element of the linear leg, the upper primary switching element of the resonant leg and the bottom primary switching element of the linear leg defining a first diagonal of the bridge and, while the first synchronous rectifier is on, transferring power from the primary side to the secondary side, wherein the transferring is characterized by linearly changing, with time, a first amplitude of first current flowing through the at least one output inductor and linearly increasing a second amplitude of magnetizing current of the transformer to a peak value of the second amplitude;
(ii) After switching off the bottom primary switching element of the linear leg and turning on the upper primary switching element of the linear leg, continuing the transferring power to the load and continuing the linearly changing of the amplitude, of current flowing through the at least one output inductor, to a lowest value of the first amplitude while maintaining the second amplitude of the magnetizing current at the peak value;
(iii) After switching off the upper switching element of the resonant leg, discharging a parasitic capacitance reflected across primary switching elements of the resonant leg, with the use of the leakage inductance;
(iv) Before switching off the upper switching element of the resonant leg, turning on a current-injection switching element corresponding to a bottom switching element of the resonant leg with a time interval that is adjustable with respect to the moment of the switching off the upper switching element to reflect an injection current, flowing through the current-injection switching element, in a secondary winding;
(v) Switching off the first synchronous rectifier after a sum of a magnetizing current, reflected in the secondary winding, and the injection current reflected into the secondary winding, exceeds the lowest value of the first amplitude by a predefined excess amount of current to cause the excess amount of current to flow into at least one primary winding while continuing the discharging the parasitic capacitance towards zero.

11. The method according to claim 10, further comprising adjusting the time interval.

12. The method according to claim 10, further comprising: (vi) Cyclically repeating at least steps (i) through (iii) with the use of the second synchronous rectifier and a second diagonal of the bridge formed by the upper primary switching element of the linear leg and a bottom primary switching element of the resonant leg, and the second synchronous rectifier.

13. The method according to claim 10, further comprising controlling the second amplitude of the magnetizing current by varying a frequency of driving signals of the primary and secondary switching elements.

14. The method according to claim 10, comprising varying an amplitude of the injection current by varying the time interval.

15. The method according to claim 10, wherein the converted is configured according to one of a center tap topology, a current doubler topology, and a full bridge rectification.

16. The method according to claim 10, further comprising the step of tailoring an amplitude of the injection current by varying a time delay to cause a discharge of a parasitic capacitance of a primary switching element of the given leg to zero before the primary switching element turns on.

17. The method according to claim 10, comprising the step of tailoring the second amplitude of the magnetizing current by varying a frequency of a driving signal of a switching element from the primary switching elements to cause a discharge of a parasitic capacitance of the switching element to zero before the switching element turns on.

18. The method according to claim 10, comprising the step of tailoring the second amplitude of the magnetizing current by varying a frequency of a driving signal of a switching element from the primary switching elements while also tailoring an amplitude of the injection current by varying the time interval to cause a discharge of a parasitic capacitance of the primary switching element to zero before the primary switching element turns on.

19. A method for operating a pulse-shifted full-bridge (PSFB) DC-DC Converter, the converter comprising:
 a primary side and a secondary side;
 an input voltage source, defining a primary energy storage element;
 a transformer having at least one primary winding at the primary side and at least two secondary windings at the secondary side, wherein a leakage inductance is formed between the at least one primary winding and the secondary windings;
 a bridge formed by two legs connected in parallel at the primary side, one leg being a linear leg and another leg being a resonant leg,
  wherein each leg is formed by corresponding bottom primary switching element and upper switching element at the primary side configured in a totem pole arrangement,
  wherein common terminals of the two legs are connected to the input voltage source,
  wherein shared terminals of switching elements within one leg, from the two legs, are connected to one end of at least one primary winding and wherein shared terminals of the switching elements of another leg, from the two legs, are connected to another end of at least one primary winding,
  wherein primary switching elements of a given leg, from the two legs, are configured to be complementary to each other during operation of the converter with a period of dead time that includes driving signals from one leg to be phase-shifted with respect to driving signals from another leg;
 first and second synchronous rectifiers at the secondary side connected to each of the secondary windings, and secondary rectification elements at the secondary side connected in parallel, wherein one of the secondary rectification elements is formed by the first synchronous rectifier and the secondary winding connected to it, and another of the secondary rectification elements is formed by the second synchronous rectifier and the secondary winding connected to it;
 at least one output inductor at the secondary side, wherein a first terminal of the at least one output inductor is connected to a load of the converter, wherein a second terminal of the at least one output inductor is directly connected to one of the common connections of the secondary rectification elements; and
 wherein the load of the converter contains a capacitor in which energy is stored, defining a secondary energy storage element;
 two active clamp circuits placed across the first and second synchronous rectifiers, wherein each of the active clamp circuits is formed by a mosfet in series with a clamp capacitor, wherein an anode of each body diode of the mosfet is connected to a drain of each of the first and second synchronous rectifiers; and
 a current-injection electronic circuit that includes:
  two current injection switching elements, respectively corresponding to switching elements in the resonant leg; and
  two current-injection windings disposed on the secondary side and coupled to the secondary windings and primary windings of the transformer; and
  two current injection capacitors;
  two diodes; and
  a voltage-injection voltage source;
  wherein the two current-injection switching elements are connected to respectively corresponding first terminals of two current-injection windings, wherein each of respectively-corresponding second terminals of the two current-injection windings is connected to a corresponding current-injection capacitor from the two current-injection capacitors;
  wherein a cathode of each of the two diodes is connected to the corresponding current-injection capacitor at the corresponding second terminal and an anode of each of the two diodes is connected to the voltage-injection voltage source;
 the method comprising:
(a) Switching on the first synchronous rectifier and the upper primary switching element of the resonant leg and a bottom primary switching element of the linear leg, wherein a current flows from the secondary energy storage element through the output inductor and through the secondary winding connected to the first synchronous rectifier and the current further reflects into the primary winding, and via the upper primary switching element of the resonant leg and a bottom primary switching element of the linear leg, the current flowing into the input voltage source transferring in this mode energy from the secondary energy storage element into the primary energy storage element;
(b) Before the first synchronous rectifier is turned off the second synchronous rectifier is turned on and the current through the output inductor starts increasing its amplitude because energy is transferred from the secondary energy storage element into the output inductor;
(c) after the first synchronous rectifier is turned off, the mosfet which is part of the active clamp circuit placed across the first synchronous rectifier is turned on for a given period of time; and
(d) The cycle continues successively alternating the first and the second synchronous rectifiers.

20. The circuit according to claim 19, wherein a diode is placed in parallel with the mosfet from the active clamp circuit, the diode having an anode connected to a source of the mosfet and a cathode connected to a drain to the mosfet.

21. The method according to claim 19, wherein the on time of the mosfet from the active clamp circuit placed across each of the secondary synchronous rectifiers and the value of the active clamp capacitor are chosen so that the current through the active clamp circuits reaches a zero level before the mosfets in the active clamps turn off.

* * * * *